United States Patent [19]

Bäbler

[11] Patent Number: 5,453,151
[45] Date of Patent: Sep. 26, 1995

[54] RESINATED 2,9-DIMETHYLQUINACRIDONE

[75] Inventor: Fridolin Bäbler, Hockessin, Del.

[73] Assignee: Ciba-Geigy Corporation, Ardsley, N.Y.

[21] Appl. No.: 187,244

[22] Filed: Jan. 25, 1994

[51] Int. Cl.$^6$ ..................................................... C09B 48/00
[52] U.S. Cl. ........................... 106/497; 106/495; 106/493; 546/56
[58] Field of Search ................... 106/495, 497; 546/56

[56] References Cited

U.S. PATENT DOCUMENTS

| | | | |
|---|---|---|---|
| 4,369,272 | 1/1983 | Jaffe | 524/88 |
| 4,439,240 | 3/1984 | Ganci | 106/497 |
| 4,478,968 | 10/1984 | Jaffe | 524/88 |
| 4,548,968 | 10/1985 | Jaffe | 524/88 |
| 5,194,088 | 3/1993 | Bäbler et al. | 106/497 |

OTHER PUBLICATIONS

Merkle et al. "Surface Treatment of Organic Pigments" in vol. III of Pigment Handbook, pp. 159–160, ed. by Patton, John Wiley & Sons, 1973, TP 936 P38p vol. 3.

*Primary Examiner*—Mark L. Bell
*Assistant Examiner*—Scott L. Hertzog
*Attorney, Agent, or Firm*—George R. Dohmann

[57] ABSTRACT

This invention relates to a resinated 2,9-dimethylquinacridone pigment, which is prepared by a process comprising (a) preparing an aqueous suspension containing a 2,9-dimethylquinacridone pigment, a mixture of water-soluble acid salts and a particle growth inhibitor, wherein the mixture of water-soluble acid salts consists essentially of from about 50 to about 95 parts by weight of a water-soluble resin acid salt, and from about 5 to about 50 parts by weight of a water-soluble salt of a napthenic acid or a dimeric acid, or a mixture thereof, (b) precipitating the mixture of acid salts from the suspension in the form of insoluble salts and (c) isolating the resinated 2,9-dimethylquinacridone pigment from the suspension. The resinated 2,9-dimethylquinacridone pigment possesses excellent dispersability, color strength, saturation and heat stability. It is especially useful for coloring plastics, coatings and inks.

24 Claims, No Drawings

RESINATED 2,9-DIMETHYLQUINACRIDONE

SUMMARY

The present invention relates to a heat-stable, dispersible and highly saturated resinated 2,9-dimethylquinacridone pigment as well as a process for preparing the resinated pigment and methods of using the pigment. The resinated pigment is useful for pigmenting high molecular weight materials, particularly plastics, inks and coatings.

BACKGROUND

The object of the present invention is to provide a magenta-colored 2,9-dimethylquinacridone pigment of high color strength, excellent dispersability, high heat stability and high saturation. This object is achieved by resinating 2,9-dimethylquinacridone with a mixture of acid salts containing a resin acid salt and a naphthenic acid salt or dimeric acid salt, preferably in the presence of a pigment particle growth inhibitor.

2,9-dimethylquinacridone is a valuable organic pigment. Due to its unique magenta shade, it is used in large quantities for the pigmentation of plastics, inks and coatings in the worldwide market. It is particularly useful as a shading component in combination with other pigments.

The resination of quinacridone pigments to improve their coloristic and dispersibility properties is also known. In general, resinated pigments are prepared by co-milling the crude pigment with the resin, such as a resin acid.

The present invention is based on the discovery that 2,9-dimethylquinacridone, which is mixed with a small amount of a pigment particle growth inhibitor, and resinated with a mixture of a resin acid salt and a naphthenic acid salt or a dimeric acid salt, or a mixture thereof, surprisingly possesses improved properties relative to non-resinated 2,9-dimethylquinacridone and higher heat stability relative to 2,9-dimethylquinacridone which is resinated with the resin acid salt alone.

Thus, the present invention relates to an improved resinated 2,9-dimethylquinacridone and a process for its preparation. The resinated 2,9-dimethylquinacridone possesses excellent dispersability, high color strength, high heat stability, high weatherability and remarkable saturation. It is prepared by resinating 2,9-dimethylquinacridone in a suspension containing the 2,9-dimethylquinacridone and a mixture of a water-soluble resin acid salt and a water-soluble naphthenic and/or dimeric acid salt and precipitating the resin acid and naphthenic and/or dimeric acid by forming an insoluble salt, wherein a pigment particle growth inhibitor is added to the suspension before, during or after the the mixture of acid salts is precipitated. The resinated pigment is suitable for coloring plastics, inks and coatings, especially applications which require excellent heat stability and/or high saturation.

DETAILED DESCRIPTION

The present invention relates to an economical process for preparing a resinated 2,9-dimethylquinacridone pigment, which process comprises (a) preparing an aqueous suspension comprising a 2,9-dimethylquinacridone pigment and a mixture of water-soluble acid salts, wherein the mixture of water-soluble acid salts consists essentially of from about 50 percent to about 95 percent by weight of a water-soluble resin acid salt, and from about 5 percent to about 50 percent by weight of a water-soluble a naphthenic acid salt or a water-soluble dimeric acid salt, or a mixture thereof, (b) precipitating the mixture of acid salts from the suspension in the form of insoluble salts, and (c) isolating the resinated 2,9-dimethylquinacridone pigment from the suspension; wherein a pigment particle growth inhibitor is added to the suspension before, during or after precipitating the mixture of acid salts. Preferably, the pigment particle growth inhibitor is present in the aqueous suspension prior to precipitating the mixture of acid salts. The present process eliminates the need to co-mill the pigment with the resin acid mixture and is thus an improvement over processes which require a co-milling step.

The 2,9-dimethylquinacridone pigments are small particle size pigments having a specific surface area greater than 45 $m^2$/gram, for example 45 to 90 $m^2$/gram, preferably from 45 to 70 $m^2$/gram, most preferably in the range from 50 to 65 $m^2$/gram. Such 2,9-dimethylquinacfidone pigments are well-known in the an and can be prepared by known methods, for example, by precipitation from sulfuric acid or by precipitation from polyphosphofic acid. Preferably, the 2,9-dimethylquinacfidone pigment is prepared by precipitation from an alkaline polar solvent, such as dimethylsulfoxide, N-methylpyrrolidone or dimethylformamide, in particular dimethyl sulfoxide.

A preferred procedure for preparing the 2,9-dimethylquinacridone pigment is by air oxidation of 2,9-dimethyl-6,13-dihydroquinacridone in the presence of a base and anthraquinone-2-sulfonic acid, as catalyst, in dimethylsulfoxide followed by precipitation in methanol. Such a process is described in U.S. application Ser. No. 07/809,898.

In general, the aqueous suspension contains about 3 to about 20 percent by weight, preferably 5 to 10 percent, of the 2,9-dimethylquinacfidone pigment.

The aqueous suspension also contains a mixture of water-soluble salts which mixture consists essentially of from about 50 percent to about 95 percent by weight of a water-soluble resin acid salt and from about 5 to 50 pans by weight of a water-soluble naphthenic acid salt or a water-soluble dimeric acid salt, or a mixture thereof. Preferably, the mixture of water-soluble salts contains from about 85 to about 95 percent by weight of the resin acid salt and from about 5 to 15 percent by weight of the naphthenic acid salt and/or the dimeric acid salt. Preferably, the mixture of water-soluble salts contains from 5 to 15 percent by weight of the naphthenic acid salt.

Resin acids are well-known in the art as constituents of rosins, such as colophony and tall-oil rosin. Rosins are complex mixtures of compounds generally derived from natural sources, for example, various trees and shrubs, especially coniferous trees. Rosin is mainly a mixture of fused ring monocarboxylic acids known as resin acids. Resin acids of the abietic and pimaric types are usually the main constituents of rosin. These resin acids have a phenanthrene nucleus and the general formula $C_{19}H_{29}COOH$. Thus, the resin acids are generally complex mixtures containing abietic acid and/or pimaric acid and which also include various isomers and/or derivatives of abietic acid and/or pimaric acid, for example, dihydro-, dehydro-, neo-, oxo- and epoxy derivatives and various substituted derivatives, such as alkyl, hydroxyl, hydroxyalkyl, for example, hydroxymethyl, or halogen substituted derivatives. Abietinic acid, abieninic acid, abietinolic acid and colophonic acid are also examples of substituents of the complex mixtures. In addition, the resin acids include the fumaric acid and maleic acid modified resin acids.

In this application, the expression "resin acid" specifically refers to the complex mixtures of resin acids derivable from rosins. However, it is intended for the expression "resin acid" to embrace both mixtures and the individual acid components of the mixtures. Individual resin acid salts or mixtures of resin acid salts are suitable.

Alkali metal salts of the resin acids are preferred water-soluble resin acid salts. The sodium and potassium salts are particularly useful, the sodium being preferred. However, any water-soluble resin acid salt is suitable. Such water-soluble salts are commonly referred to as resin acid soaps.

Mixtures containing water-soluble salts of abietic acid and its derivatives are preferred water-soluble resin acid salts. In particular, water-soluble salts, especially the sodium salt, of a resin acid known to the artisan as "pale rosin" is particularly suitable. A particularly suitable pale rosin salt is X-DRESINATE from HERCULES.

The naphthenic acids are cycloparaffinic carboxylic acids. In general, the naphthenic acids are any of the derivatives of cyclopentane, cyclohexane, cycloheptane or cyclooctane or other naphthenic homologs derived from petroleum. Generally, many naphthenic acids are of the formula $R-(CH_2)_n-COOH$, wherein R is a cycloalkane nucleus of one or more rings, generally from 1 to 5 rings, normally cyclopentane and/or cyclohexane, especially cyclopentane, and n is chosen such that the molecular weight ranges from about 180 to about 350. If there is more than one cycloalkane ring, the rings are generally fused. Normally, naphthenic acids are available as mixtures of the cycloparaffinic carboxylic acids. Naphthenic acids are further described in *The Kirk-Othmer Encyclopedia of Chemical Technology*, 3rd Edition, Vol. 15, pages 749–753 (John Wiley & Sons, N.Y.). In this application, the expression "naphthenic acid" generally means a mixture of these cycloparaffinic carboxylic acids.

Dimeric acids are also well-known, especially in the polyamide resin art. A dimetic acid is a high molecular weight dibasic carboxylic acid which contains an aliphatic, cycloaliphatic and/or aromatic moiety. Preferred dimefie acids have a molecular weight in the range of about 500 to about 600. The dimetic acids are commonly isomeric mixtures of acyclic, monocyclic, bicyclic or polycyclic unsaturated dibasic carboxylic acids containing 36 carbon atoms. Such dimetic acids are prepared, for example, by dimefizing unsaturated fatty acids, such as oleic, elaidic, linoleic or tall oil fatty acids. However, $C_{19}$ dicarboxylic acids, which are formed by the reaction of oleic acid with carbon monoxide, and $C_{21}$ dicarboxylic acids, which are produced by catalyzed condensation of acrylic acid with the linoleic acid fraction of tall oil fatty acids, are also suitable dimefie acids. Dimer acids are further described in *The Kirk-Othmer Encyclopedia of Chemical Technology*, 3rd Edition, Vol. 7, pages 768–781 (John Wiley & Sons, N.Y.). In this application, the expression "dimefie acid" means such a mixture of dibasic carboxylic acids.

Alkali metal salts of the naphthenic acids and dimeric acids are preferred water-soluble acid salts. The sodium and potassium salts are particularly useful, the sodium salts being preferred. However, any water-soluble salt is suitable for use in the present process.

It is preferable for the mixture of water-soluble salts to consist of an abietic acid salt or abietic acid derivative salt and a naphthenic acid salt. A particularly preferred mixture of acid salts consists of a salt of pale rosin and a naphthenic acid salt or a mixture of naphthenic acid salts, preferably in a weight ratio of from 85:15 to 95:5.

Throughout this application, the expression "acid salts" refers to the mixture containing the resin acid salt and the naphthenic acid salt and/or the dimeric acid salt. In general, the acid salts are mixtures of water-soluble or water-insoluble salts according to the process step under discussion.

The mixture of water-soluble salts is preferably added in solution form to the pigment suspension in an amount of from about 5 to about 20 parts, preferably 8 to 18 parts, per 100 parts of the 2,9-dimethylquinacridone pigment.

A pigment particle growth inhibitor is added to the suspension before, during or after the precipitation step. Normally, 1 to about 6 parts by weight, preferably 2 to 4 parts, of the particle growth inhibitor, per 100 parts by weight of the 2,9-dimethylquinacridone pigment, is added to the suspension prior to the isolation step. It is preferred to add the pigment particle growth inhibitor to the aqueous suspension before the precipitation step.

Accordingly, the aqueous suspension will preferably contain from about 1 to about 6 parts by weight, preferably 2 to 4 parts, of the particle growth inhibitor per 100 parts by weight of the 2,9-dimethylquinacridone pigment.

The pigment pigment particle growth inhibitors used according to the present invention are generally quinacridone derivatives. Quinacridone derivatives such as unsubstituted or substituted quinacridone sulfonic acids, phthalimidomethylquinacridones, imidazolylmethylquinacridones, pyrazolylmethylquinacridones or N-mono- or di-alkylarninoalkylsulfonamidoquinacridones are are useful in the present invention and are well known particle growth inhibitors, as well as anti-flocculant agents. Substituted and unsubstituted phthalimidomethylquinacridone derivatives are especially suitable pigment particle growth inhibitors, unsubstituted phthalimidomethylquinacridone being preferred.

In a preferred process, the aqueous presscake of a pigmentary 2,9-dimethylquinacridone is suspended in water and an alkaline solution containing the mixture of acid salts, which also contains the suspended particle growth inhibitor, is added to form an aqueous suspension. The aqueous suspension is stirred in order to ensure thorough mixing and then the acid salts are precipitated by adding a cation which precipitates the acids as insoluble acid salts to the aqueous suspension. The resinated pigment is then isolated by customary methods.

Cations of alkali earth metals and aluminum are highly suitable for precipitating the acids. However, any cation which forms an insoluble salt with the acids is suitable.

Normally, the cation is added to the aqueous suspension as an aqueous solution containing a soluble salt of the cation. Especially suitable salts are the halide or sulfate salts of the alkaline earth metals and aluminum. For example, calcium and magnesium chloride and aluminum sulfate are highly suitable salts.

Generally, sufficient cation to precipitate all of the acids are added to the aqueous suspension. A slight excess of the cation is desirable. However, slightly less than the amount required to precipitate all of the acids is also suitable. The amount of cation which is added to the suspension depends on the acid salt and cation used.

The resinated pigment is isolated by customary methods, preferably by filtration followed by washing. A preferred isolation procedure comprises filtration at a pH of about 5.0 to about 6.5, preferably at a pH of about 5.5 to 6.0, followed by washing with water and drying.

In a preferred method, an aqueous alkaline solution containing about 2 to about 15 percent by weight of the water-soluble acid salts is prepared separately at a temperature of 25° to 50° C., preferably 35° to 45° C. The particle growth inhibitor is suspended in the aqueous a solution of the acid salts. The alkaline mixture of acid salts and particle growth inhibitor is then added to an aqueous suspension of the 2,9-dimethylquinacridone pigment. The aqueous 2,9-dimethylquinacfidone pigment suspension containing the alkaline acid salt mixture and pigment particle growth inhibitor is then stirred at room temperature to provide homogeneous mixing of the pigment, the acid salts and the particle growth inhibitor. Then a slight excess of the cation salt dissolved in water, for example, calcium chloride dissolved in water, is added to precipitate the dissolved acid salt mixture. The suspension is further stirred for from 15 minutes to 5 hours, preferably 1 to 2 hours, preferably at room temperature and a pH of about 5.5 to 6.0. The resinated pigment suspension is then filtered, washed with water, dried and pulverized.

Although it is preferred to add the pigment particle growth inhibitor to the aqueous suspension prior to the precipitation step as decsfibed above, the pigment particle growth inhibitor can be added to the suspension at any time prior to to isolation step, such as before, during or after the precipitation step.

The present invention further relates to a resinated 2,9-dimethylquinacridone pigment, which comprises a homogeneous blend consisting of 74 to 94 parts by weight of a small particle size 2,9-dimethylquinacfidone pigment, from 1 to 6 parts by weight of a pigment particle growth inhibitor and from 5 to 20 pans by weight of a mixture of water-insoluble acid salts, wherein the sum of the pans by weight is 100, which mixture of water-insoluble acid salts consists essentially of from 50 to 95 percent by weight of a water-insoluble resin acid salt or a mixture of water-insoluble resin acid salts and from 5 to 50 percent by weight of a water-insoluble naphthenic or dimefie acid salt or a mixture thereof. The resinated 2,9-dimethylquinacridone pigment is characterized by excellent dispersability, high color strength, high saturation and superior heat stability.

The resinated 2,9-dimethylquinacridone pigment preferably comprises 8 to 18 parts of the mixture of water-insoluble acid salts, from 2 to 4 parts of the pigment particle growth inhibitor and from 78 to 90 parts of the 2,9-dimethylquinacridone pigment, wherein the parts add up to 100 parts by weight.

Phthalimidomethylquinacridone is the preferred pigment particle growth inhibitor.

Preferably, the mixture of water-insoluble acid salts comprises from about 85 to about 95 percent by weight of a salt of abietic acid, a derivative of abietic acid or a mixture thereof and from about 5 to 15 percent by weight of water-insoluble naphthenic acid salts and/or water-insoluble dimefie acid salts. A particularly preferred mixture of water-insoluble acid salts consists of an insoluble salt of pale rosin and an insoluble naphthenic acid salt, preferably in a weight ratio of from 85:15 to 95:5.

The resinated 2,9-dimethylquinacridone of this invention is suitable for use as a pigment for coloring high molecular weight organic materials. Examples of high molecular weight organic materials which may be colored or pigmented with the resinated 2,9-dimethylquinacridone of this invention are cellulose ethers and esters such as ethylcellulose, nitrocellulose, cellulose acetate, cellulose butyrate, natural resins or synthetic resins such as polymerization resins or condensation resins, for example aminoplasts, in particular urea/formaldehyde and melamine/formaldehyde resins, alkyd resins, acrylic resins, phenolic plastics, polycarbonates, polyolefins, polystyrene, polyvinyl chloride, polyamides, polyether, polyetherketone, polyurethanes, polyesters, rubber, casein, silicone and silicone resins, singly or in mixture.

The above high molecular weight compounds may be used singly or as mixtures in the form of plastics, melts or of spinning solutions, varnishes, paints or printing inks. Depending on the end use, it is advantageous to use the pigments as toners or in the form of preparations. The resinated pigment of the invention is employed in an effective pigmenting amount, preferably about 0.1 to 30% by weight based on the high molecular organic material to be pigmented. Pigmentation of high molecular weight organic compounds with the pigments of this invention is carded out, for example, by incorporating such pigments, optionally in the form of a masterbatch, into the substrates using roller mills, mixing or grinding machines. The pigmented material is then brought into the desired final form by methods which are known per se, for example, calendering, molding, extruding, coating, spinning, casting or by injection molding. It is often desirable to incorporate plasticizers into the high molecular compounds before processing in order to produce non-brittle moldings or to diminish their brittleness. Suitable plasticizers are, for example, esters of phosphoric acid, phthalic acid or sebacic acid. The plasticizers may be incorporated before or after working the composition into the polymers. To obtain different shades, it is also possible to add filers or other chromophoric components such as white, colored or black pigments, in any amount, to the high molecular weight organic compounds, in addition to the compositions of this invention.

For pigmenting varnishes and printing inks, the high molecular weight organic materials and the pigments obtained according to the present invention, together with optional additives such as fillers, other pigments, siccatives or plasticizers, are finely dispersed or dissolved in a common organic solvent or mixture of solvents. The procedure may be such that the individual components or blends thereof are dispersed or dissolved in the solvent and subsequently all the components are mixed.

The resinated 2,9-dimethylquinacridone according to this invention demonstrates excellent dispersability when incorporated in plastic materials, thus, providing a high color strength despite the addition of the colorless resin mixture. Additionally, it shows a very high saturation for a magenta pigment. The high saturation makes it particularly useful as a shading component in combination with other organic, and/or inorganic pigments and/or polymer soluble dyes and/or effect pigments such as aluminum or $TiO_2$-coated mica pigments.

Whereas many organic pigments demonstrate insufficient heat stability when applied in high performance thermoplastics due to partial solubility of the pigment at high temperature, the resinated 2,9-dimethylquinacridone prepaxed by the present process manifests high heat stability. The resinated 2,9-dimethylquinacridone also has excellent migration properties.

Many resin extended pigments show "fogging" behavior, thus releasing the resin as a function of time and temperature when incorporated in plastic substrates. No "fogging" is observed using resinated 2,9-dimethylquinacridone prepared according to the present process.

The following examples further describe the embodiments of the instant invention. In these examples all parts given are by weight unless otherwise indicated.

EXAMPLE 1

A 1 liter flask equipped with a thermometer, stirrer, condenser and gas inlet tube is charged with 102 grams 2,9-dimethyl-6,13-dihydroquinacridone, 1.6 grams anthraquinone-2-sulfonic acid, sodium salt monohydrate and 550 ml dimethylsulfoxide. The suspension is stirred and a mixture of 78 grams 45% aqueous potassium hydroxide and 60 ml water are added. The reaction mixture is heated to 80°–83° C. During the heating period the oxidation mixture is flushed with nitrogen to an oxygen content of 0% in the off-gas stream indicated by an oxygen analyzer. Air is then introduced under the surface of the stirred reaction mixture at a rate of 200 ml/minute for 115 to 120 minutes until the oxygen analyzer indicates 6% oxygen in the off-gas stream. 1.4 grams phthalimidomethylquinacridone is added as particle growth inhibitor and the reaction mixture is further stirred under air flow for 5 minutes.

A separate 5 liter flask equipped with a stirrer, condenser and thermometer is charged with 2.0 liter methanol at 20°–25° C. The above deep blue hot reaction mixture is transferred into the methanol, precipitating the magenta 2,9-dimethylquinacridone. The pigment suspension is stirred for 2 hours at 38°–42° C., and then filtered. The presscake is successively washed dimethylsulfoxide free with about 2 liters of methanol and then 3.5 liters of hot water until methanol and base free.

The aqueous pigment presscake has a weight of 550 grams with a solid content of 18%, thus, containing 99 g of pigmentary 2,9-dimethylquinacridone.

EXAMPLE 2

A 300 ml beaker is charged with 100 ml water, 3.0 grams X-DRESINATE, the sodium salt of a pale rosin (HERCULES, Inc.) are added and dissolved by stirring and heating to 40° C, 0.3 grams naphthenic acid (MERICHEM Co.) and 0.15 grams of 50% sodium hydroxide are added. The mixture is stirred with a magnetic stirrer until dissolved. 0.85 grams phthalimidomethylquinacridone are then added.

A liquifier blender from OSTER equipped with a glass container having a capacity of 1.25 liters is charged with 123 grams aqueous presscake containing 22 g 2,9-dimethylquinacridone obtained according to Example 1,200 ml water and the above acid salt/phthalimidomethylquinacridone mixture to form an aqueous suspension. The aqueous suspension is blended at room temperature until homogeneous and then transferred into a 2 liter beaker equipped with stirrer. A solution of 1.1 grams calcium chloride in 40 ml water is added and the pH is adjusted to 5.5 to 6.0 by the addition of diluted hydrochloric acid. The magenta-colored pigment suspension is stirred for 1 hour at pH 5.5 to 6.0 and room temperature. The pigment suspension is then filtered. The presscake is washed with water, dried and pulverized, yielding: 25.5 grams resinated 2,9- dimethylquinacridone having excellent pigment properties like heat stability, weathembility, dispersibility, saturation and high color strength when applied in plastics, inks or coatings.

EXAMPLE 3

The procedure of Example 2 is repeated using 2.2 grams X-DRESINATE and 1.1 grams of PRIPOL 1009, a dimeric acid from UNICHEMA, as acid mixture. The procedure yields a resinated 2,9-dimethylquinacridone which has excellent pigment properties when incorporated into plastics or inks.

EXAMPLE 4

The procedure of Example 2 is repeated using 2.2 grams X-DRESINATE, 0.7 grams PRIPOL 1009 and 0.2 grams naphthenic acid as acid mixture. The procedure yields a resinated 2,9-dimethylquinacridone which has a high color strength, excellent heat stability, weatherability, migration and fogging resistance when incorporated in plastics.

EXAMPLE 5A

Five grams of resinated 2,9-dimethylquinacridone prepared according to Example 2, 2.5 grams CHIMASORB 944 LD (hindered amine light stabilizer), 1.0 gram TINUVIN 328 (benzotriazole UV absorber), 1.0 gram IRGANOX 1010 (hindered phenol antioxidant) and 1.0 gram IRGANOX 168 (phosphite process stabilizer) (all additives from CIBA-GEIGY Corp.) are mixed in a BANBURY mixer together with 1000 grams of high density polyethylene, QUANTUM MICROTHENE MA-778 from U.S.I. QUANTUM Chem. at a speed of 175–200 rpm for 30 seconds after flux. The fluxed pigmented resin is chopped up while warm and malleable, and then fed through a granulator. The resulting granules are molded on a BATIENFELD 1000 injection molder with a 5 minute dwell time and a 30-second cycle time at temperatures of 205° C., 260° C., and 315° C., respectively. Homogeneous colored chips, which show a similar magenta color at each of the temperature steps, are obtained.

EXAMPLE 6

The following mixture is prepared in a fluid mixer by stirring for about 5 minutes at a speed of 1400 rpm.
92.0 grams - vinyl resin (VINNOL 865D, WACKER),
8.0 grams - vinyl copolymer (VESTOLIT HIS 7587, HÜS),
1.5 grams - epoxidized soya bean oil plasticizer,
2.8 grams - barium/cadmium stabilizer,
0.7 grams - organic phosphite auxiliary stabilizer (IRGASTAB CH-300, CIBA-GEIGY)
0.4 grams - fatty acid ester (IRGAWAX 370, CIBA-GEIGY),
0.2 grams - paraffin oil derivative lubricant (IRGAWAX 360, CIBA-6EIGY)
0.25 grams- benzotriazole derivative light stabilizer (TINUVIN 320, CIBA-GEIGY)

A mixture of 25 parts by weight of the rigid PVC mixture so obtained is combined with 0.25 parts by weight of a 2,9-dimethylquinacridone, which was prepared according to Example 2, and mixed in a HENSCHEL-mixer at room temperature for about 3 minutes at a speed of about 2000 rpm. The pigmented rigid PVC so obtained is pressed on a roll mill for 6 minutes at 190° C., 25 rpm and a friction of 1:1.2, and then pressed at 190° C. for 6 minutes on a BURKLE press between chromium-plated steel plates to a thickness of about 1 mm. The pressed sheet so obtained is of magenta color and exhibits excellent fastness to light and weathering.

EXAMPLE 7

The procedure of Example 5A is repeated using polypropylene HIMONT PRO-FAX 6401 from HIMONT instead of high density polyethylene as a substrate to yield magenta colored chips which show excellent heat and lightfastness properties.

EXAMPLE 8A 1.6 grams of the resinated 2,9-dimethylquinacridone obtained according to Example 2 are predispersed in 2.4 grams of epoxidized soyabean oil type G-62 from ROHM & HAAS by mixing it with a spatula.

150 grams clear master batch medium hard polyvinyl chloride POLYFLEX from DAYON (OH) are rolled on a two-roll calendar at 292° F. (143° C.)-298° F. (148° C.) by constant folding, removal and feeding. 3.8 grams of the above described pigment/soyabean oil dispersion are added into the rolling hot PVC sheet and the sheet is rolled another ten times by constant folding, removal and feeding. The resulting medium hard PVC sheet is colored in a homogenous strong magenta color shade with excellent lightfastness properties.

EXAMPLE 8B

A heat treatment test of the calendered PVC sheet obtained according to Example 8A at 180° C. for 10 and 30 minutes and at 200° C. for 10 minutes does not change the color, demonstrating the excellent heat stability of the resinated 2,9-dimethylquinacridone.

EXAMPLE 8C

A migration test was carried out by contacting the magenta colored PVC sheet obtained according to Example 8A with a white flexible PVC sheet containing 5% $TiO_2$ at 80° C. for 24 hours and 1 kp/cm² pressure. No migration of the magenta pigment into the white PVC sheet is observed.

EXAMPLE 8D

The rolls of the calendar used for the incorporation of resinated 2,9- dimethylquinacridone into the PVC polymer according to Example 8A were cleaned with white pigmented PVC containing 5% $TiO_2$. The white PVC sheet does not pick up a magenta hue, demonstrating that no "plate out" is observed using the resinated 2,9-dimethylquinacridone pigment.

EXAMPLE 9

The procedure of Example 8A is repeated using a mixture of 1.5 grams $TiO_2$ and 0.15 grams of the resinated 2,9-dimethylquinacridone obtained according to Example 2, yielding the white reduction in a highly saturated magenta color. The pigment is homogeneously dispersed, no pigment aggregates are observed when the PVC sheet is viewed under a microscope.

EXAMPLE 10

A mixture of 100 grams of polyethylene terephthalate granules and 1.0 grams of the resinated 2,9-dimethylquinacridone prepared according to Examples 2 to 4 are blended for 15 minutes in a glass bottle on a roller gear bed. Extrusion of the mixture into a ribbon in a laboratory extruder produces a ribbon colored in a uniform magenta color which possesses excellent light and heat fastness.

EXAMPLE 11

The procedure described in Example 10 is repeated using GPM 5600, an ABS resin from GENERAL ELECTRIC, to yield ribbons having a uniform and strong magenta color with excellent fastness properties.

EXAMPLE 12

A mixture of 130 grams of 8 mm diameter steatite balls, 47.5 grams of alkyd melamine baking finish, which baking finish is a mixture consisting of 60 grams of aikyd resin (BECKOSOL 27–320 from Reichhold Chemic AG) 50% in xylene:butanol (2:1 mixture), 2 grams of xylene, 2 grams of ethylene glycol monomethyl ether and 2.5 grams of the resinated 2,9-dimethylquinacridone pigment obtained in Example 2, are dispersed in a 200 ml capacity glass flask with a twist-off cap on a roll stand for 120 hours. After the steatite bails have been separated, 2.4 grams of the full tone mixture thus dispersed is mixed with 6.0 grams of titanium dioxide, KRONOS 59 from KRONOS TITAN GmbH) and a further 24.0 grams of the above described alkyd reelamine baking finish. The mixture thus obtained is sprayed onto aiuminum panels and subsequently baked at 130° C. for 30 minutes. The resulting magenta finish shows excellent fastness properties.

EXAMPLE 13

A mixture of 130 grams of steatite balls (diameter: 8mm) and 45 grams of a thermosetting acrylic finish which finish is a composition containing:

41.3 grams of acrylic resin (VIACRYL VC373, 60%, from VIANOVA Kunstharz AG), 16.3 grams of melamine resin (MAPRENAL TTX, 55% from HOECHST AG), 32.8 grams of xylene, 4.6 grams of ethylglycol acetate 2.0 grams of butyl acetate and 1.0 grams of Siliconoil A, 1% in xylene (BAYER AG); and 2.5 grams of the resinated 2,9-dimethylquinacridone obtained in Example 2 are dispersed in a 200 ml glass flask with a twist-off seal on a roll stand for 72 hours. The steatite balls are separated and 8.0 grams of the millbase, 0.6 grams of aluminum paste (ALCOA, 60–65% Al content), 1.0 grams of methyl ethyl ketone and 18.4 grams of the above mentioned thermosetting acrylic finish are thoroughly mixed. The resulting mixture is sprayed onto aluminum panels and subsequently baked at 130° C. for 30 minutes. A strong magenta metallized coating having excellent fastness properties is obtained.

I claim:

1. A process for preparing a resinated 2,9-dimethylquinacridone pigment, which process comprises (a) preparing an aqueous suspension comprising a small particle size 2,9-dimethylquinacridone pigment and a mixture of water-soluble acid salts, wherein the mixture of water-soluble acid salts consists essentially of from about 50 to about 95 percent by weight of a water-soluble resin acid salt, and from about 5 to about 50 percent by weight of a water-soluble naphthenic acid salt or a water-soluble dimeric acid salt, or a mixture thereof, (b) precipitating the mixture of acid salts from the suspension as insoluble salts and (c) isolating the resinated 2,9-dimethylquinacridone pigment from the suspension; wherein a pigment particle growth inhibitor is added to the suspension before, during or after precipitating the mixture of acid salts.

2. A process of claim 1 wherein the pigment particle growth inhibitor is present in the aqueous suspension before the mixture of acid salts is precipitated.

3. A process of claim 2 wherein the resin acid salt comprises a water-soluble salt of abietic acid or a water-soluble salt of a derivative of abietic acid or a mixture thereof.

4. A process of claim 2 wherein the resin acid is the sodium salt of pale rosin.

5. A process of claim 2 wherein the mixture of water-soluble acid salts consists of from 85 to 95 parts by weight of the resin acid salt and from 5 to 15 parts by weight of the naphthenic acid salt and/or the dimeric acid salt.

6. A process of claim 2 wherein the mixture of water-soluble acid salts consists of from 85 to 95 parts by weight of the resin acid salt and from 5 to 15 parts by weight of the naphthenic acid salt.

7. A process of claim 6 wherein the resin acid salt is the sodium salt of pale rosin.

8. A process of claim 2 wherein the aqueous suspension comprises from 5 to 10 percent by weight of the 2,9-dimethylquinacridone pigment.

9. A process of claim 2 wherein the aqueous suspension comprises from 5 to 20 parts by weight of the mixture of water-soluble acid salts per 100 parts by weight of the 2,9-dimethylquinacridone pigment.

10. A process of claim 2 wherein the aqueous suspension comprises from 8 to 18 parts by weight of the mixture of water-soluble acid salts per 100 parts by weight of the 2,9-dimethylquinacridone pigment.

11. A process of claim 2 wherein the aqueous suspension comprises from 1 to 6 parts of the particle growth inhibitor per 100 parts by weight of the 2,9-dimethylquinacfidone pigment.

12. A process of claim 2 wherein the particle growth inhibitor is a unsubstituted or substituted quinacridone sulfonic acid, phthalimidomethylquinacridone, imidazolylmethylquinacridone, pyrazolylmethylquinacridone, or mono- or di-alkylaminoalkylsulfonamidoquinacridone.

13. A process of claim 2 wherein said pigment particle growth inhibitor is phthalimidomethylquinacridone.

14. A process of claim 2 wherein the acid salts are precipitated by adding a cation which forms insoluble acid salts to the aqueous suspension.

15. A process of claim 14 wherein the cation is a calcium, magnesium or aluminum cation.

16. A process of claim 14 wherein the acid salts are precipitated by mixing the aqueous suspension with an aqueous solution containing a water-soluble salt of the cation.

17. A process of claim 16 wherein the water-soluble salt is calcium chloride, magnesium chloride or aluminum sulfate.

18. A process of claim 2 wherein the aqueous suspension is prepared by mixing an aqueous solution containing the dissolved mixture of water-soluble acid salts and the suspended particle growth inhibitor with a suspension of the 2,9-dimethylquinacridone pigment in water.

19. A process of claim 2 wherein the 2,9-dimethylquinacridone pigment is prepared from 2,9-diimethyl-6,13-dihydroquinacridone in dimethylsulfoxide by air oxidation in the presence of a base and a anthraquinone-2-sulfonic acid catalyst, followed by precipitation in methanol.

20. A resinated 2,9-dimethylquinacridone pigment, which pigment comprises a homogeneous blend consisting of 74 to 94 parts by weight of a small particle size 2,9-dimethylquinacridone pigment, from 1 to 6 parts by weight of a pigment particle growth inhibitor and from 5 to 20 parts by weight of a mixture of water-insoluble acid salts, the sum of the parts by weight being 100, which mixture of water-insoluble acid salts consists essentially of from 50 to 95 percent by weight of a water-insoluble resin acid salt and from 5 to 50 percent by weight of a water-insoluble naphthenic or dimetic acid salt or a mixture thereof.

21. A resinated 2,9-dimethylquinacridone pigment of claim 20 wherein the mixture of water-insoluble acid salts consists of an insoluble salt of pale rosin and an insoluble naphthenic acid salt.

22. A resinated 2,9-dimethylquinacridone pigment of claim 20 wherein the water-insoluble acid salt is a calcium, magnesium or aluminum salt.

23. A resinated 2,9-dimethylquinacridone pigment of claim 20 wherein the pigment particle growth inhibitor is phthalimidomethylquinacridone.

24. A method of coloring a high molecular weight organic material, which comprises incorporating an effective pigmenting amount of a resinated 2,9-dimethylquinacridone pigment into the high molecular weight organic material, wherein the resinated 2,9-dimethylquinacridone pigment comprises 100 parts by weight of a homogeneous blend consisting essentially of 74 to 94 parts by weight of a small particle size 2,9-dimethylquinacridone pigment, from 1 to 6 parts by weight of a pigment particle growth inhibitor and from 5 to 20 parts by weight of a mixture of water-insoluble acid salts which mixture consists of from 50 to 95 percent by weight of a water-insoluble resin acid salt and from 5 to 50 percent by weight of a water-insoluble naphthenic or dimeric acid salt or a mixture thereof.

* * * * *